April 20, 1926.
F. C. FULCHER
1,581,998
STRAINING OR FILTERING APPARATUS
Filed Nov. 26, 1923     4 Sheets-Sheet 1
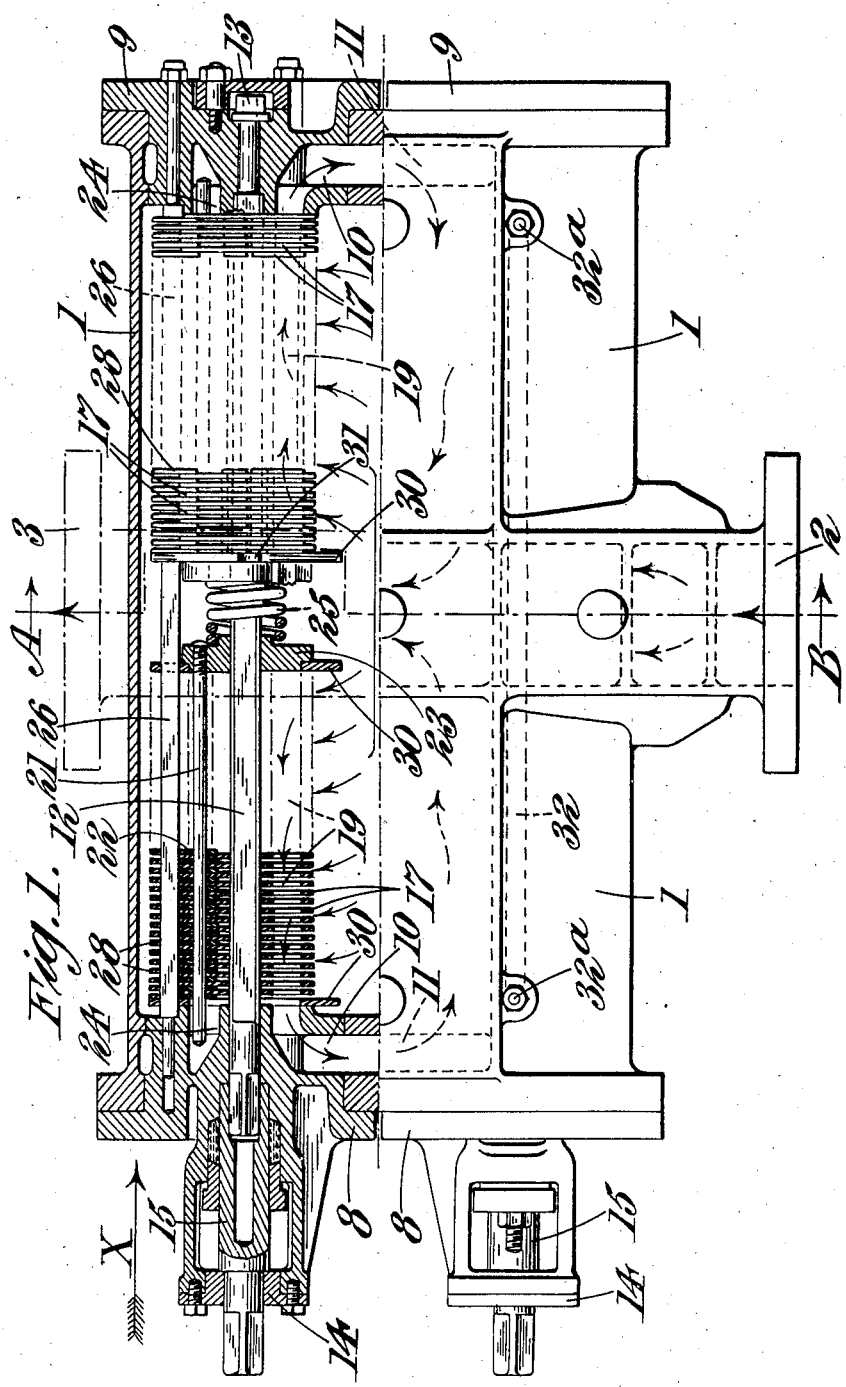
Inventor
F. C. Fulcher
Per Hubert E Peck Atty.

April 20, 1926.
F. C. FULCHER
1,581,998
STRAINING OR FILTERING APPARATUS
Filed Nov. 26, 1923 4 Sheets-Sheet 2
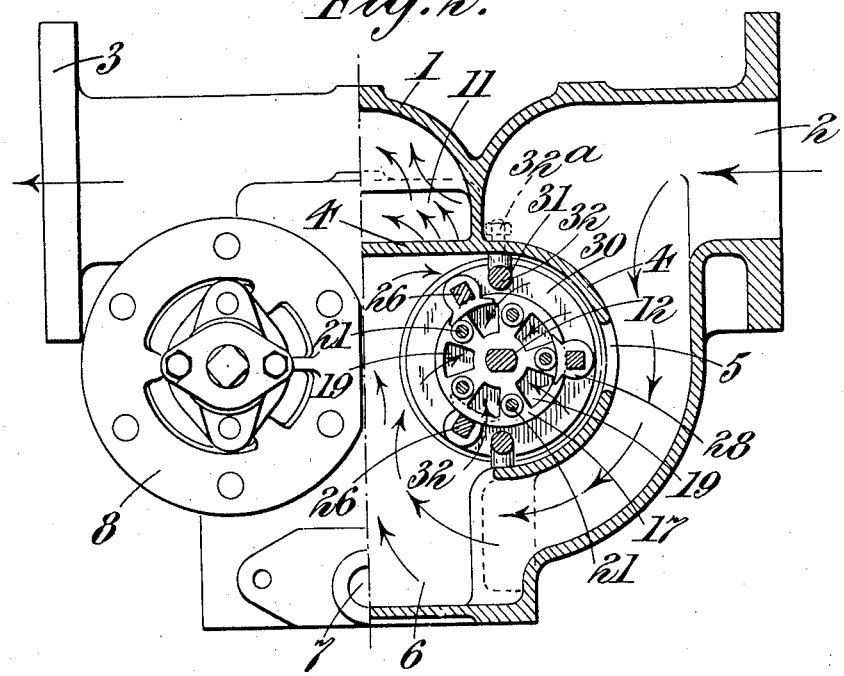
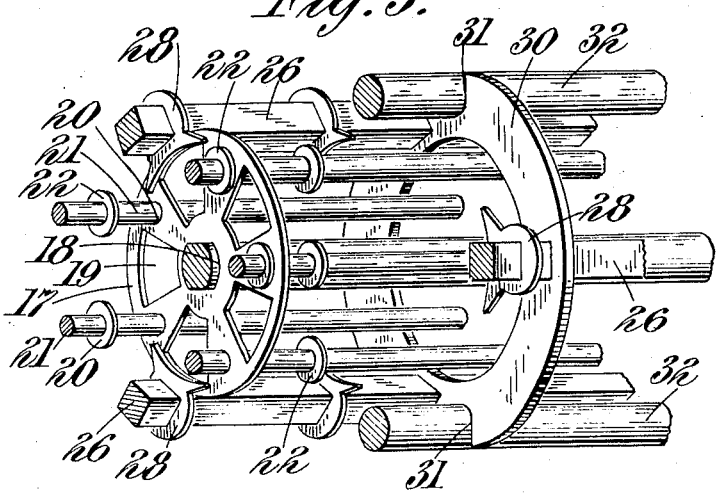
Inventor
F. C. Fulcher

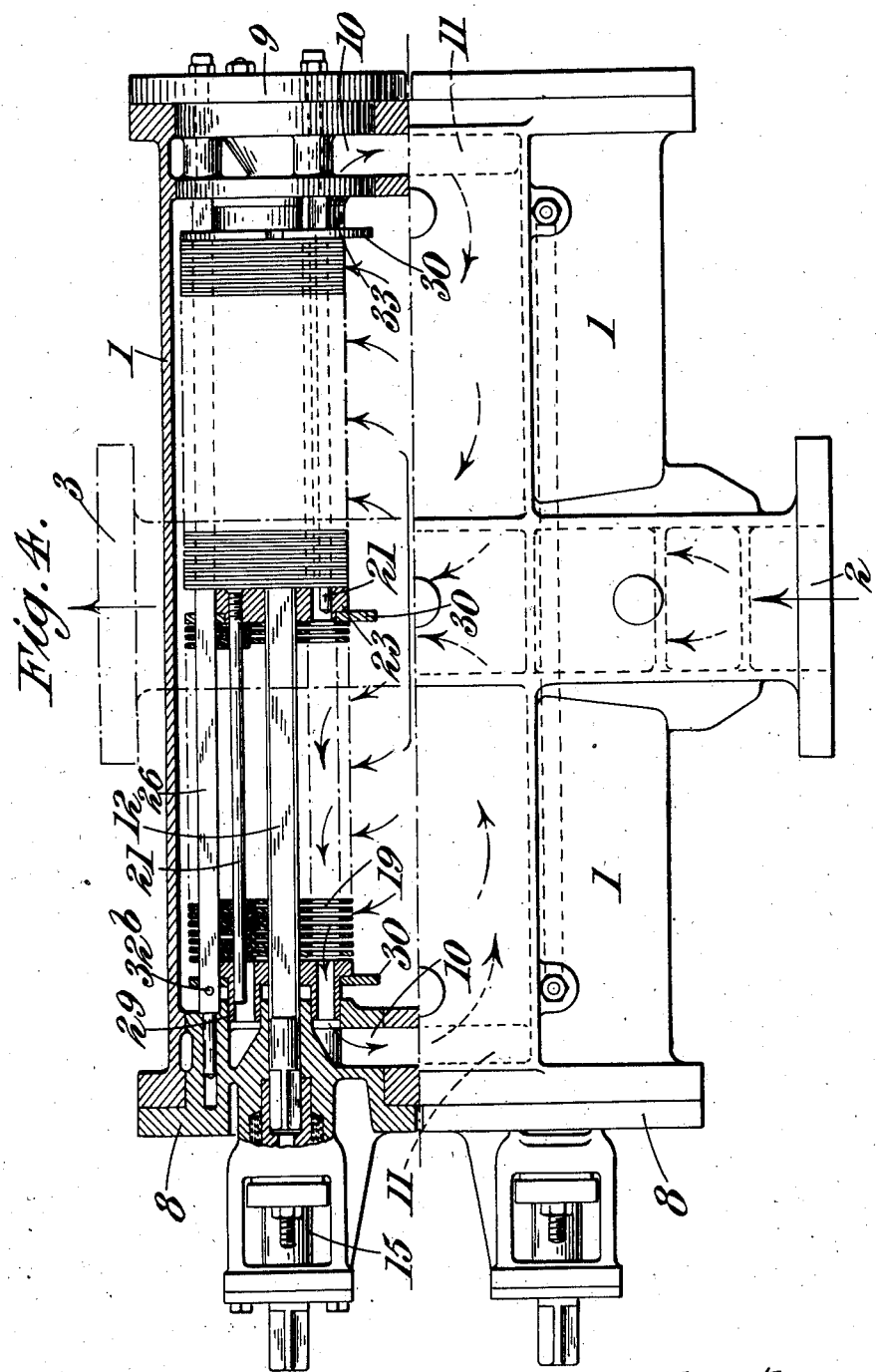

April 20, 1926.
F. C. FULCHER
1,581,998
STRAINING OR FILTERING APPARATUS
Filed Nov. 26, 1923     4 Sheets-Sheet 4
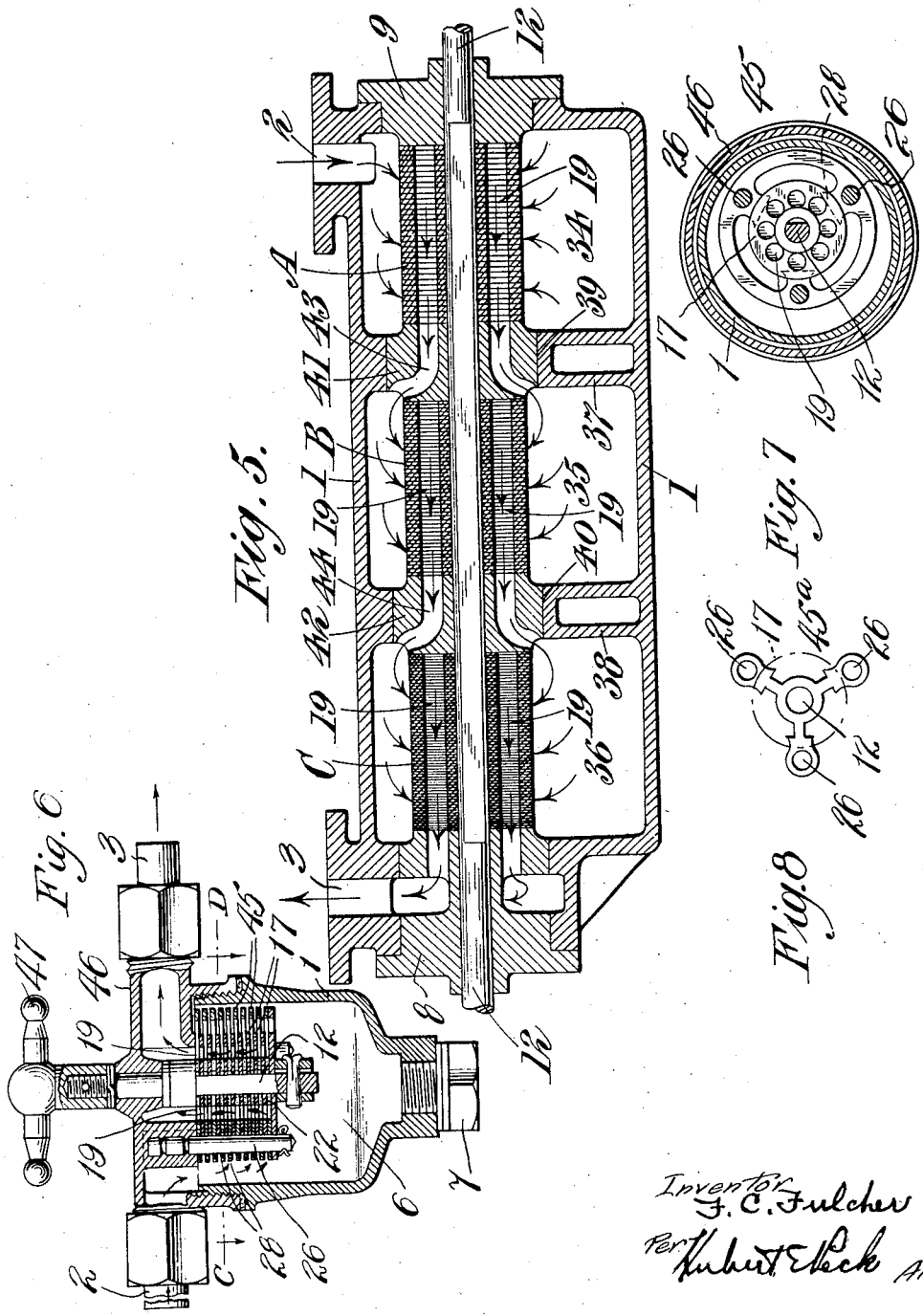

Patented Apr. 20, 1926.

1,581,998

UNITED STATES PATENT OFFICE.

FRANK CHRISTIAN FULCHER, OF LONDON, ENGLAND.

STRAINING OR FILTERING APPARATUS.

Application filed November 26, 1923. Serial No. 677,000.

*To all whom it may concern:*

Be it known that I, FRANK CHRISTIAN FULCHER, a subject of the King of Great Britain, and resident of London, England, have invented new and useful Improvements in or Relating to Straining or Filtering Apparatus, of which the following is a specification.

This invention relates to straining or filtering apparatus for fluids and it has for its object to provide improvements by means of which certain advantages shall be obtained.

The strainer is of the kind comprising a cylindrical straining wall having an outlet for the fluid, a circumferential slot or slots through which the fluid is strained and a scraper comprising a blade or blades projecting into each slot and in permanent engagement therewith, the scraper and the cylindrical straining wall being relatively movable so that the blade or blades will traverse the slot or slots; such a strainer is described in the specification of Letters Patent No. 1,414,120 granted to the applicant herein.

According to the present invention, a strainer for fluid of the kind described above is characterized by the fact that the straining wall consists of a plurality of discs or plates mounted side by side on a carrier and each having a hole or holes therethrough, separators disposed between adjacent discs or plates to space them apart and form an endless peripheral slot, said separators being either integral with or separate from the discs or plates, and a scraper blade or scraper blades mounted on a carrier and permanently engaging said slot, said discs or plates and the scraper blade or blades being relatively movable.

The discs or plates may be mounted on a shaft that extends centrally therethrough and the scraper blade or scraper blades may be mounted on a rod or rods external to the straining wall.

In a modification of the invention, the discs or plates are mounted on rods that pass through holes in the discs or plates adjacent their peripheries, said discs or plates being separated the one from another or others by washers on said rods.

Straining or filtering apparatus, according to the present invention, comprises a casing having an inlet and an outlet for the fluid, the strainer being mounted in said casing and the duct or ducts formed by the hole or holes through the discs or plates being connected to the outlet or inlet. The strainer may be mounted on an end closure for the casing and be removable therewith.

According to a further modification of the invention, a plurality of strainers is arranged end to end or in line within the casing, the carriers for the discs or plates and the scraper blades being common to the several strainers, the adjacent ends of the strainers being separated or not from one another.

In order that the invention may be clearly and readily understood, reference will now be made to the accompanying drawings on which several embodiments are illustrated:—

Fig. 1 is a view, the lower portion of which is in plan and the upper portion in horizontal section, of one embodiment;

Fig. 2 being a view in which the left hand portion is in end elevation looking in the direction of the arrow "X" Fig. 1, and the right hand portion a vertical section on the line A—B Fig. 1; and Fig. 3 a detail view in perspective showing the mode of mounting the strainer discs or plates and the scraper blades on their carriers;

Fig. 4 is a similar view to Fig. 1 of another embodiment;

Fig. 5 is a diagrammatic view with the scraper blades and the carriers for the discs or plates and scraper blades omitted, illustrating an arrangement of strainers in series;

Fig. 6 is a vertical sectional view partly in elevation of a third embodiment, and Fig. 7 a horizontal section on the line C—D of Fig. 6.

Fig. 8 is a view showing a modified form of scraper blades combined with a carrier.

Referring to Figs. 1, 2 and 3:

1 is a casing within which four strainers arranged in two sets are mounted. Each set comprises two strainers disposed end to end or in line, the two sets of strainers being disposed side by side and parallel to one another. The casing has an inlet 2 and an outlet 3, and internally, a wall 4 which separates the inlet from the outlet and also serves to direct the entering fluid towards the lower part of the casing, whence it rises and passes between and to the parallel sets of strainers. The wall 4 partly encircles one set of strainers and to provide direct access for the entering fluid to parts of the strainers adjacent and partly encircled by the said wall it is provided with an orifice or with orifices 5. The lower portion of the casing constitutes a sump 6 and is provided with a drain connection 7. Hand holes may be provided for the removal of matter that fails to pass through the strainer. The casing 1 has an opening in each of its end walls opposite each set of strainers, the openings in one end wall being closed by closures 8 and in the other end wall by closures 9. The closures 8, 9 are removably secured in position and each is provided with a duct or ducts extending from its inner face to a groove 10 in a peripheral portion by which, when the closure is in position, connection is made with the outlet 3 through a duct 11 constituted in the casing 1.

One set of strainers and the mode of mounting and assembling the constituent parts will now be described the construction, mounting and assembling of the other set of strainers being identical.

12 is a shaft rotatably mounted in the closures 8, 9. It is removably secured in the closure 9 by a nut 13 and when so secured is prevented from endwise movement by a shoulder abutting against the inner face of the closure 9. The extreme outer end of the shaft 12 mounted in the closure 8 is of a section other than circular, as is the portion of the shaft between the inner faces of the closures. Mounted on the outer face of the closure 8 in line with the shaft 12 is a bearing 14 for a shaft 15. The shaft 15 is, from its inner end, hollow for a portion of its length and at its outer end is provided with, or adapted for the reception of, means by which it may be rotated. The closure 8 is adapted to receive the inner end of the shaft 15 which internally is of a section to engage the outer end of the shaft 12. The two shafts 12, 15 are thus coupled together and when rotary motion is imparted to the shaft 15 the shaft 12 is moved correspondingly. The shaft 12 serves to carry the two strainers constituting a set. Each strainer comprises a plurality of discs 17, each having a plurality of holes or openings therethrough, namely, a centrally disposed hole 18 of a section and size similar to that of the shaft 12, and by which it is mounted thereon and coupled thereto so that the rotary motion of the shaft 12 is imparted to the discs 17, and two circular rows of holes 19, 20. The holes 19 are larger than the holes 20 and alternate therewith. The holes 20 are disposed adjacent to the peripheries of the discs 17. The holes 19, 20 are further so disposed that when the discs 17 are mounted on their carriers, as hereafter described, the holes in the several discs coincide and the holes 19 constitute ducts. 21 are rods which are passed through the holes 20 and constitute carriers for the discs 17. The rods 21 also carry washers 22 which are employed to separate adjacent discs so that a slot is formed therebetween, the width of which is dependent on the thickness of the washers 22. The rods 21 pertaining to one strainer are mounted on their one ends in a carrier 23, which is, itself, mounted on the shaft 12 so as to rotate therewith and at their other ends enter a circular groove 24 formed in the inner face of the closure 8 or 9. As many discs 17 and washers 22 are placed on the shaft 12 and rods 21 as are necessary to produce a strainer of the desired area. The two strainers mounted on the shaft 12 are pressed apart and into contact with the inner faces of the closures 8, 9 by a spring 25 that encircles the shaft 12 and is positioned between, and bears at its end on, the carriers 23. 26 are rods of a section other than circular, three are shown, which extend the length of the casing 1 and are mounted at their one ends in the closure 9 and at their other ends enter holes in the closure 8. The rods 26 constitute carriers for the scraper blades 28, each of which is formed of a piece of metal having a hole therethrough of a shape to permit it to be mounted on, and prevented from movement relatively to, the rod 26. There are as many scraper blades 28 on each rod 26 as there are slots formed by and between discs 17 and the scraper blades are positioned on the rods so that each enters a slot formed by and between adjacent discs 17. The scraper blades 28 are each of a thickness substantially equal to or slightly less than the thickness of the washers 22. The scraper blades are further of such formation that their operative faces or edges are oblique or inclined to the peripheries of the discs 17 so that when the discs 17 are rotated in relation thereto they will act to raise the fluff, dirt or suspended matter contained in the fluid being filtered or strained and intercepted by the edges of the discs away from the strainer.

The ducts 19 are each in communication with the slots formed by and between adjacent discs 17 and at one end with the groove 10 in the closure 8 or 9.

In operation, the fluid to be strained passes into the casing through the inlet 2, thence radially between the discs 17 to the ducts 19 and away through the grooves 10 and ducts 11 to the outlet 3, any dirt, fluff, suspended or other matter contained in the fluid being intercepted by the edges of the discs 17 which, in course of time, become coated as in the case of gauze. To clean the strainer, the shaft 12 is rotated through the shaft 15, whereby the discs 17 are moved in relation to the scraper blades 28. The action of the scraper blades 28 is to remove any intercepted matter from the entrances to the slots and carry it clear of the strainer face, whence it falls into the sump 6 and is removed either through the drain connection 7 or the hand holes.

With the construction described the two strainers mounted on the shaft 12 may be withdrawn as an entity by removal of the means securing the closure 9 in position and the withdrawal of such closure, together with the parts (shaft 12, rods 26) mounted thereon and carrying the discs 17 and scraper blades 28 endwise, from the casing.

Alternatively, by mounting the rods 26 in the closure 8 and omitting the nut 13, the two strainers mounted on a shaft 12 may be withdrawn as an entity by removal of the means securing the closure 8 in position and the withdrawal of such closure, together the parts (shaft 12, rods 26) mounted thereon and carrying the discs 17 and scraper blades 28 endwise, from the casing.

It is often necessary to provide additional means for supporting and guiding the strainers when being inserted into, or withdrawn from, the casing 1 and these means conveniently are in the form of rings 30. The rings 30 are spaced apart along the strainer. Three such rings 30 are shown in the construction illustrated in Fig. 1, one encircling each carrier 23 and one being placed in contact with the outer face of the disc 17 adjacent the closure 8. Each ring 30 has two cut-away portions 31 diametrically disposed. The rings 30 are mounted on rails 32 and engage therewith by means of the cut-away portions 31. The rails 32 are mounted at their ends within the casing 1 as shown at 32ᵃ and form an additional support for the strainers and also serve as guides for the strainers when being moved into or out of the casing 1. The rings 30 are formed with holes through which the rods 26 extend.

In the embodiment illustrated in Fig. 4, a modified method of mounting the rods 21 is shown. In this embodiment, the spring 25 is dispensed with and the rods 21 pertaining to the right hand strainer are fixedly mounted at their one ends in a carrier 33 and at their other ends enter holes in a carrier 23 that is disposed between the two strainers and serves also as a mounting for the one end of the rods 21 of the left hand strainer, the other end of which rods enter holes in a casing 29 which is a sliding fit in a recess in the closure 8. The casing 29 is mounted on the shaft 12 so as to rotate therewith and is also made with openings therethrough for connection of the ducts 19 with the groove 10. The casting 29 is provided for the purpose of compensating for contraction or expansion of the discs in use. The ring 30 of the left hand strainer adjacent the closure 8 is mounted on the casting 29 and is prevented from endwise movement by pins 32ᵇ which pass through the rods 26. When the casting 29 is not used the rods 21 may enter annular grooves in the closure 8 as in Fig. 1, or the construction shown in Fig. 1 may be provided with a casting 29.

It will be understood that though embodiments have been described with reference to Figs. 1 to 3 inclusive, and to Fig. 4, in which two sets of strainers, each set comprising two strainers placed end to end are mounted in a common casing side by side and parallel to one another, many modifications may be made without departing from the invention. For example, only one strainer may be employed, or if desired, more than two strainers may be mounted in line.

In the strainer illustrated in Fig. 5, there is employed a plurality of strainers mounted end to end in a casing 1 closed at its ends by closures 8, 9 and divided into a plurality of compartments 34, 35, 36, by divisions 37, 38 each division having a central hole 39, 40 respectively, in which is mounted an obturator 41, 42 respectively, having ducts 43, 44 respectively therethrough. The strainers A, B, C, are mounted in the compartments 34, 35, 36 respectively, the strainer A being contained between the closure 9 and obturator 41. The ducts 19 in the strainer A are in communication through the ducts 43 with the compartment 35. Similarly, the ducts 19 in the strainer B are in communication through the ducts 44 with the compartment 36 and the ducts 19 in the strainer C with the outlet 3. The fluid to be filtered passes through the strainers A, B, C in series. In such apparatus, the coarseness of the strainers may vary, thus, the strainer A may have coarse straining slots, the intermediate strainer B finer slots, and the third and last strainer C the finest slots.

Further, the strainer or strainers may be mounted in a casing in a vertical position and in the smaller sizes of vertical strainers it is not necessary to provide a bearing for the inner end of the shaft 12 or the rods 26 carrying the scraper blades. Such an embodiment is illustrated in Figs. 6 and 7. In this embodiment, the discs 17 have ducts 19 therethrough as already described and are mounted on the shaft 12 in a manner somewhat analogous to the arrangement described with reference to Figs. 1, 2 and 3. The scraper blades 28 are disposed on their carrying rods 26 so that each enters a slot formed by and between adjacent discs 17 and are constituted by inward radial projections of a ring 45 which is provided with holes through which the rods 26 pass. The strainer is mounted on a cover 46 having an inlet 2 and an outlet 3, the casing 1 being screwed into the cover 46 and the shaft 12 which passes through the cover being provided exteriorly thereof with a handle 47 by means of which the discs may be rotated relatively to the scraper blades. The operation of this strainer is as described with reference to the strainer illustrated in Figs. 1 to 3 inclusive, the arrows indicating the flow of liquid. By making the washers 22 which, in this construction, are threaded on the shaft 12 and the scraper blades 28 of thin metal, for example, one thousandth of an inch in thickness, the strainer is suitable for straining liquids, such as petrol.

Instead of the scraper blades 28 projecting inward radially from a ring 45 as described with reference to Figs. 6 and 7, they may be constituted on outward radial projections or arms from a ring 45ª as shown in Fig. 8. The ring 45ª is mounted on the shaft 12 and its internal diameter is such as to permit of movement of the shaft 12 relatively therethrough, the outer ends of the radial projections or arms each having a hole therethrough to receive a rod 26.

Further, in lieu of employing washers 22 separate from the discs, the discs may be spaced apart by means of projections formed in the metal of the discs by pressure. Such projections may surround either the central shaft 12 or the rods 26 as is found expedient.

It is also to be understood that in a strainer in accordance with this invention, the scraper blades may be constituted by wire extending across the casing 1 and passing through the slots; the wire may be in the form of a more or less flattened loop mounted on opposite sides of the discs 17 on rods or otherwise.

A strainer according to the present invention is applicable for straining either liquids or gases.

What I claim is:—

1. A strainer for fluid comprising a straining wall consisting of a plurality of plane discs mounted side by side on a carrier and each having a hole therethrough, separators between adjacent discs to space them apart and form endless peripheral slots through which straining takes place and scraper blades separate from the discs, extending inwardly through said slots and each permanently engaging a slot, said discs and scraper blades being relatively movable.

2. A strainer for fluid comprising a straining wall consisting of a plurality of plane discs mounted side by side on a carrier and each having a hole therethrough, separators separate from the discs disposed between adjacent discs to space them apart and form endless peripheral slots through which straining takes place and scraper blades separate from the discs, extending inwardly through said slots and mounted on a carrier and each permanently engaging a slot, said discs and scraper blades being relatively movable.

3. A strainer for fluid comprising a straining wall consisting of a plurality of plane discs mounted side by side on a shaft that extends centrally therethrough, and each having a hole therethrough, separators disposed between adjacent discs to space them apart and form endless peripheral slots through which straining takes place and scraper blades mounted on a rod external to the straining wall and each permanently engaging a slot, said discs and scraper blades being relatively movable.

4. A strainer for fluid comprising a straining wall consisting of a plurality of plane discs mounted side by side on a shaft that extends centrally therethrough, and each having a hole therethrough, rods that pass through holes in the discs adjacent their peripheries, washers on said rods between adjacent discs to space them apart and form endless peripheral slots through which straining takes place, and scraper blades mounted on a rod external to the straining wall and each permanently engaging a slot, said discs and scraper blades being relatively movable.

5. A strainer for fluid comprising a casing having an inlet opening and an outlet opening for the fluid, a straining wall mounted therein consisting of a plurality of plane discs mounted side by side on a carrier and each having a hole therethrough, separators between adjacent discs to space them apart and form endless peripheral slots through which straining takes place, scraper blades separate from the discs, extending inwardly through said slots and each permanently engaging a slot, said discs and scraper blades being relatively movable, and the duct formed by the holes through the discs in connection with an opening in the casing.

6. A strainer for fluid comprising a casing having an inlet opening and an outlet opening for fluid, a straining wall mounted therein consisting of a plurality of plane discs mounted side by side on a carrier and each having a hole therethrough, separators between adjacent discs to space them apart and form endless peripheral slots through which straining takes place, scraper blades each permanently engaging a slot, said discs and scraper blades being relatively movable and the duct formed by the holes through the discs in connection with an opening in the casing, an opening in the end wall of the casing opposite the end of the straining wall and a closure for said opening in which the straining wall and scraper blade carriers are mounted.

7. A strainer for fluid comprising a casing having an inlet opening and an outlet opening for fluid, a straining wall mounted therein consisting of a plurality of plane discs mounted side by side on a shaft that extends centrally therethrough and each having a hole therethrough, rods that pass through holes in the discs adjacent to and within their peripheries, washers on said rods between adjacent discs to space them apart and form endless peripheral slots through which straining takes place, scraper blades mounted on a rod external to the straining wall each permanently engaging a slot, said discs and scraper blades being relatively movable and the duct formed by the holes through the discs in connection with an opening in the casing.

8. A strainer for fluid comprising a casing having an inlet opening and an outlet opening for fluid, a straining wall mounted therein consisting of a plurality of plane discs mounted side by side on a shaft that extends centrally therethrough and each having a hole therethrough, rods that pass through holes in the discs adjacent their peripheries, washers on said rods between adjacent discs to space them apart and form endless peripheral slots through which straining takes place, scraper blades mounted on a rod external to the straining wall, each permanently engaging a slot, said discs and scraper blades being relatively movable and the duct formed by the holes through the discs in connection with an opening in the casing, an opening in the end wall of the casing opposite the end of the straining wall and a closure for said opening in which the shaft and rods carrying the washers and the scraper blades are mounted.

9. A strainer for fluid comprising a casing having an inlet opening and an outlet opening for fluid, a straining wall mounted therein consisting of a plurality of plane discs mounted side by side on a carrier and each having a hole therethrough, separators between adjacent discs to space them apart and form endless peripheral slots through which straining takes place, scraper blades each permanently engaging a slot, said discs and scraper blades being relatively movable and the duct formed by the holes through the discs in connection with an opening in the casing, rods within the casing extending longitudinally thereof, rings mounted on the straining wall having cut-away portions to engage said rods, an opening in the end wall of the casing opposite the end of the straining wall and a closure for said opening in which the straining wall and scraper blade carriers are mounted.

10. A strainer for fluid comprising a casing having an inlet opening and an outlet opening for the fluid, a plurality of straining walls mounted therein in line each consisting of a plurality of plane discs mounted side by side on a common carrier and each having a hole therethrough, separators between adjacent discs to space them apart and form endless peripheral slots through which straining takes place, scraper blades separate from the discs, extending inwardly through said slots and each permanently engaging a slot, said discs and scraper blades being relatively movable and the duct formed by the holes through the discs in connection with an opening in the casing.

11. A strainer for fluid comprising a casing having an inlet opening and an outlet opening for fluid, a plurality of straining walls mounted therein in line each consisting of a plurality of plane discs mounted side by side on a common carrier and each having a hole therethrough, separators between adjacent discs to space them apart and form endless peripheral slots through which straining takes place, scraper blades each permanently engaging a slot, said discs and scraper blades being relatively movable and the duct formed by the holes through the discs in connection with an opening in the casing, an opening in the end wall of the casing opposite the end of the straining wall and a closure for said opening in which the straining wall and scraper blade carriers are mounted.

12. A strainer for fluid comprising a casing having an inlet opening and an outlet opening for fluid, a plurality of straining walls mounted therein in line each consisting of a plurality of plane discs mounted side by side on a common carrier and each having a hole therethrough, separators between adjacent discs to space them apart and form endless peripheral slots through which straining takes place, scraper blades each permanently engaging a slot, said discs and scraper blades being relatively movable and the duct formed by the holes through the discs in connection with an opening in the casing, rods within the casing extending longitudinally thereof, rings mounted on the straining walls having cut-away portions to engage said rods, an opening in the end wall of the casing opposite the end of the straining wall and a closure for said opening in which the straining wall and scraper blade carriers are mounted.

13. A strainer for fluid comprising a casing having an inlet opening and an outlet opening for fluid and divided longitudinally into a plurality of compartments, a straining wall mounted in each compartment each consisting of a plurality of plane discs mounted side by side, each having a hole therethrough, a common carrier for the discs of all the straining walls, separators between adjacent discs to space them apart and form endless peripheral slots through which straining takes place, scraper blades each permanently engaging a slot, said discs and scraper blades being relatively movable, a common carrier for the scraper blades of all the straining walls, the ducts formed by the holes through the discs of one straining wall in connection with an opening in the casing and the ducts formed by holes in the discs of other straining walls connected to the next succeeding compartment by ducts in the division walls, an opening in the end wall of the casing opposite the end of the straining wall and a closure for said opening in which the straining wall and scraper blade carriers are mounted.

14. A strainer for fluid comprising a straining wall consisting of a plurality of plane discs mounted side by side on a carrier and each having a hole therethrough, separators between adjacent discs to space them apart and form endless peripheral slots through which straining takes place and scraper blades each permanently engaging a slot and having their operative edges inclined to the peripheries of the discs, said discs and scraper blades being relatively movable.

15. A strainer for fluid comprising a straining wall consisting of a plurality of plane discs mounted side by side on a shaft that extends centrally therethrough, rods that pass through holes in the discs adjacent their peripheries, washers on said rods between adjacent discs to space them apart and form endless peripheral slots through which straining takes place, and scraper blades mounted on a rod external to the straining wall each permanently engaging a slot, and having their operative edges inclined to the peripheries of the discs, said discs and scraper blades being relatively movable.

16. A strainer for fluid comprising a casing having an inlet opening and an outlet opening for the fluid, a straining wall mounted therein consisting of a plurality of plane discs mounted side by side on a carrier and each having a hole therethrough, separators between adjacent discs to space them apart and form endless peripheral slots through which straining takes place, scraper blades each permanently engaging a slot and having their operative edges inclined to the peripheries of the discs, said discs and scraper blades being relatively movable and the duct formed by the holes through the discs in connection with an opening in the casing.

17. A strainer for fluid comprising a casing having an inlet opening and an outlet opening for fluid, a straining wall mounted therein consisting of a plurality of plane discs mounted side by side on a carrier and each having a hole therethrough, separators between adjacent discs to space them apart and form endless peripheral slots through which straining takes place, scraper blades each permanently engaging a slot and having their operative edges inclined to the peripheries of the discs, said discs and scraper blades being relatively movable and the duct formed by the holes through the discs in connection with an opening in the casing, an opening in the end wall of the casing opposite to the end of the straining wall and a closure for said opening in which the straining wall and scraper blade carriers are mounted.

18. A strainer for fluid comprising a casing having an inlet opening and a outlet opening for fluid, a straining wall mounted therein consisting of a plurality of plane discs mounted side by side on a shaft that extends centrally therethrough and each having a hole therethrough, rods that pass through holes in the discs adjacent their peripheries, washers on said rods between adjacent discs to space them apart and form endless peripheral slots through which straining takes place, scraper blades mounted on a rod external to the straining wall each permanently engaging a slot and having their operative edges inclined to the peripheries of the discs, said discs and scraper blades being relatively movable and the duct formed by the holes through the discs in connection with an opening in the casing, an opening in the end wall of the casing opposite the end of the straining wall and a closure for said opening in which the shaft and rods carrying the washers and the scraper blades are mounted.

19. A strainer for fluid comprising a casing having an inlet opening and an outlet opening for the fluid, a straining wall mounted therein consisting of a plurality of plane discs mounted side by side on a carrier and each having a hole therethrough, separators between adjacent discs to space them apart and form endless peripheral slots through which straining takes place, scraper blades each permanently engaging a slot and having their operative edges inclined to the peripheries of the discs, said discs and scraper blades being relatively movable and the duct formed by the holes through the discs in connection with an opening in the casing, rods within the casing extending longitudinally thereof, rings mounted on the straining wall and having cut away portions to engage said rods, an opening in the end wall of the casing opposite the end of the straining wall and a closure for said opening in which the straining wall and scraper blade carriers are mounted.

20. A strainer for fluid comprising a casing having an inlet opening and an outlet opening for fluid and divided longitudinally into a plurality of compartments, a straining wall mounted in each compartment each consisting of a plurality of plane discs mounted side by side, each having a hole therethrough, a common carrier for the discs of all the straining walls, separators between adjacent discs to space them apart and form endless peripheral slots through which straining takes place, scraper blades each permanently engaging a slot and having their operative edges inclined to the peripheries of the discs, said discs and scraper blades being relatively movable, a common carrier for the scraper blades of all the straining walls, the ducts formed by the holes through the discs of one straining wall in connection with an opening in the casing and the ducts formed by holes in the discs of other straining walls connected to the next succeeding compartment by ducts in the division walls, an opening in the end wall of the casing opposite the end of the straining wall and a closure for said opening in which the straining wall and scraper blade carriers are mounted.

Dated this seventh day of November, 1923.

F. C. FULCHER.